(12) United States Patent
Chen

(10) Patent No.: US 7,134,611 B2
(45) Date of Patent: Nov. 14, 2006

(54) AIR NOZZLE FOR PNEUMATIC TOOLS

(75) Inventor: Lung-Hui Chen, Zhubei (TW)

(73) Assignee: Sunmatch Industrial Co., Ltd., Zhubei (TW)

( * ) Notice: Subject to any disclaimer, the term of this patent is extended or adjusted under 35 U.S.C. 154(b) by 224 days.

(21) Appl. No.: 10/852,097

(22) Filed: May 25, 2004

(65) Prior Publication Data

US 2005/0263616 A1   Dec. 1, 2005

(51) Int. Cl.
B05B 1/28 (2006.01)
B05B 3/00 (2006.01)
B05B 3/06 (2006.01)
B05B 1/32 (2006.01)

(52) U.S. Cl. .............. 239/290; 239/291; 239/293; 239/225.1; 239/237; 239/251; 239/452

(58) Field of Classification Search ........ 239/290, 239/291, 293, 301, 225.1, 244, 237, 240, 239/243, 251, 380, 381, 451, 452
See application file for complete search history.

(56) References Cited

U.S. PATENT DOCUMENTS 5,707,009 A * 1/1998 Schneider .......... 239/112
5,727,735 A * 3/1998 Baumann et al. ....... 239/112
5,803,372 A * 9/1998 Weinstein et al. ....... 239/703
5,853,127 A * 12/1998 Heembrock .............. 239/227
6,189,804 B1 * 2/2001 Vetter et al. .................. 239/7
6,478,242 B1 * 11/2002 Knobbe et al. ........... 239/690

FOREIGN PATENT DOCUMENTS

TW         333485        8/1988

* cited by examiner

Primary Examiner—Davis Hwu
(74) Attorney, Agent, or Firm—Birch, Stewart, Kolasch & Birch, LLP

(57) ABSTRACT

The present invention discloses an improved air nozzle of a pneumatic tool for being connected to the pneumatic tool that will not be tangled easily due to the rotation of the pneumatic tool during its operation, and thus preventing any hinder to the pressurized gas inputted from the air supply pipe into the pneumatic tool or any adverse influence to the efficiency of the operation. The invention comprises an air inlet member having one end connected to the pneumatic tool and the other end rotably connected to a rotary member, such that the rotary member rotates with respect to the air inlet member and drives the air supply pipe connected to the rotary member to rotate during the operation of the pneumatic tool, and thus the air supply pipe will not be tangled easily and the invention enhances the flexibility and convenience of the operation of the pneumatic tool.

3 Claims, 3 Drawing Sheets

AIR NOZZLE FOR PNEUMATIC TOOLS

FIELD OF THE INVENTION

The present invention relates to an improved air nozzle of pneumatic tools, more particularly to a pneumatic tool that will not be tangled easily by its air supply pipe.

BACKGROUND OF THE INVENTION

In general, most conventional pneumatic tools are driven by inputting a pressurized gas through an air supply pipe connected to the pneumatic tool by an appropriate detachable air nozzle. Further, the air nozzle is connected to a handle of the pneumatic tool by a screwing method or other fixing method.

However, these conventional pneumatic tools usually have a drawback, since the air supply pipe is made of a hard and solid material and generally connected to the air nozzle, therefore the air supply pipe of the pneumatic tool cannot be rotated independently. As a result, when the pneumatic tool is rotated, an adjacent pipe section of the air supply pipe winds around the pneumatic tool, which will reduce the flexibility of controlling the pneumatic tool. In addition, the wound air supply pipe will reduce the pressurized gas supply and affect the operating quality of the pneumatic tool.

Please refer to the R.O.C. Patent No. 333485 entitled "Device, throttle and air bushing for pneumatic tools", which disclosed a rotary air bushing for rotating and connecting a pneumatic tool to a pressurized gas supply tube. The air bushing comprises a first groove formed on the external surface of the air bushing and a pillar being inserted inside the handle of the pneumatic tool to cope with its rotation. Such structure allows the air bushing to rotate along the vertical axis inside the handle of the pneumatic tool. When the soft air supply tube is connected to the outer end of the air bushing, the pneumatic tool can rotate independently.

However, this prior art needs to have a hole on the handle, and insert a pillar into the hole of the handle to fasten a complementary groove disposed on the circumferential surface of the air bushing, which complicates the manufacturing process, increases the cost and also spoils the structure of the pneumatic tool that may give rise to a leakage of the pressurized gas.

SUMMARY OF THE INVENTION

The primary objective of the present invention is to overcome the foregoing shortcoming and avoid the exiting deficiency. The present invention provides an improved air nozzle for pneumatic tools, so that the air supply pipe connected to the air nozzle will not be tangled with the pneumatic tool due to the rotation of the pneumatic tool during its operation, and thus preventing any hinder to the pressurized gas inputting from the air supply pipe into the pneumatic tool. Furthermore, the invention does not need to set a hole on the handle of the pneumatic tool, which will spoil the structure of the pneumatic tool and may cause a leakage of the pressurized gas.

To achieve the foregoing objective, an improved air nozzle of the pneumatic tool of the present invention comprises an air inlet member having one end connected to the pneumatic tool and the other end rotably connected to a rotary member, so that the rotary member rotates with respect to the air inlet member and drives the air supply pipe connected to the rotary member to rotate during the operation of the pneumatic tool, and thus the air supply pipe will not be tangled easily, and the invention further enhances the flexibility and convenience of the operation of the pneumatic tool.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENTS

To make it easier for our examiner to understand the objective of the invention, its structure, innovative features, and performance, we use a preferred embodiment and the attached drawings for the detailed description of the invention.

Figure 1:
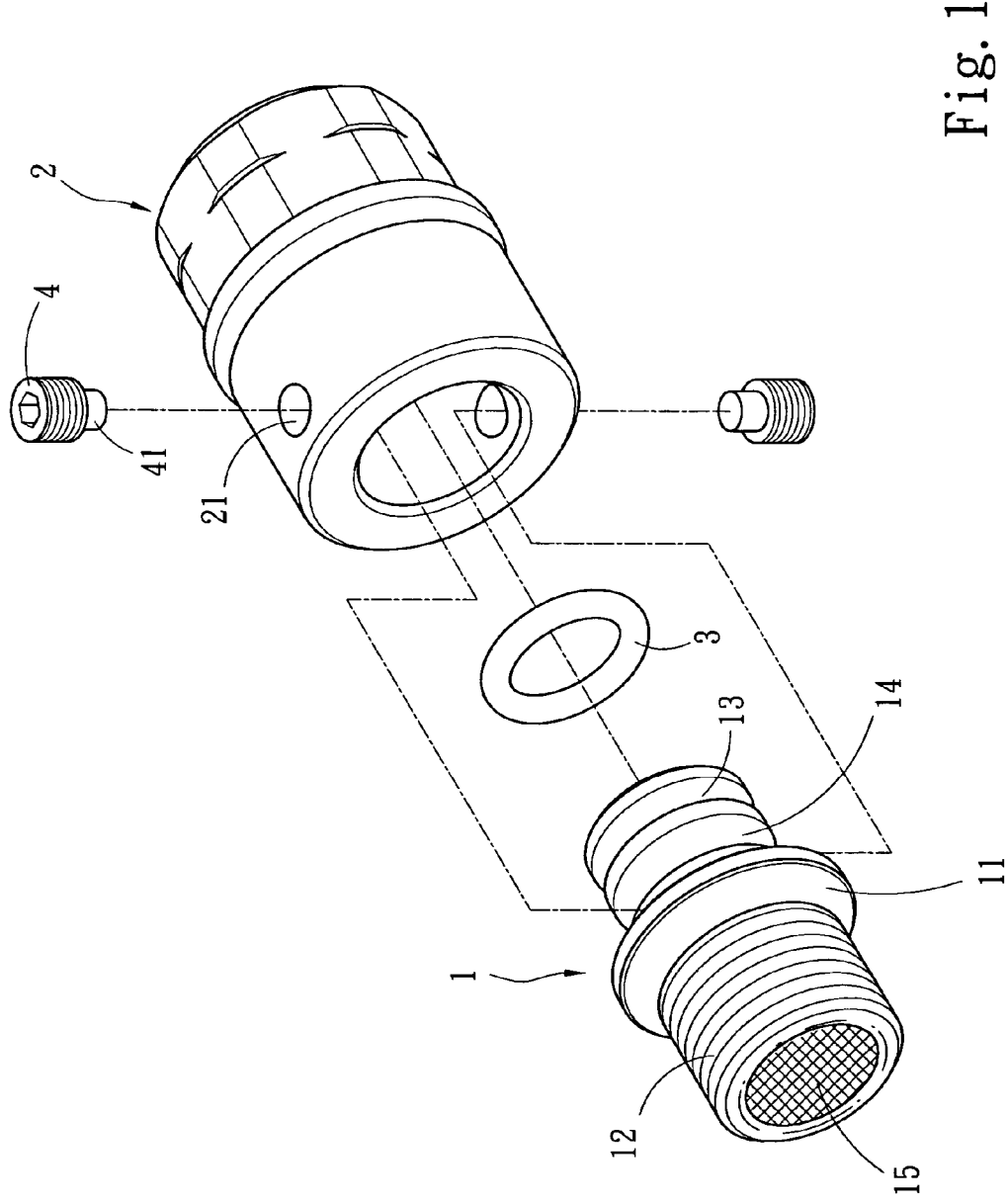
FIG. 1 is a view of the dissembled parts of the present invention.
Figure 2:
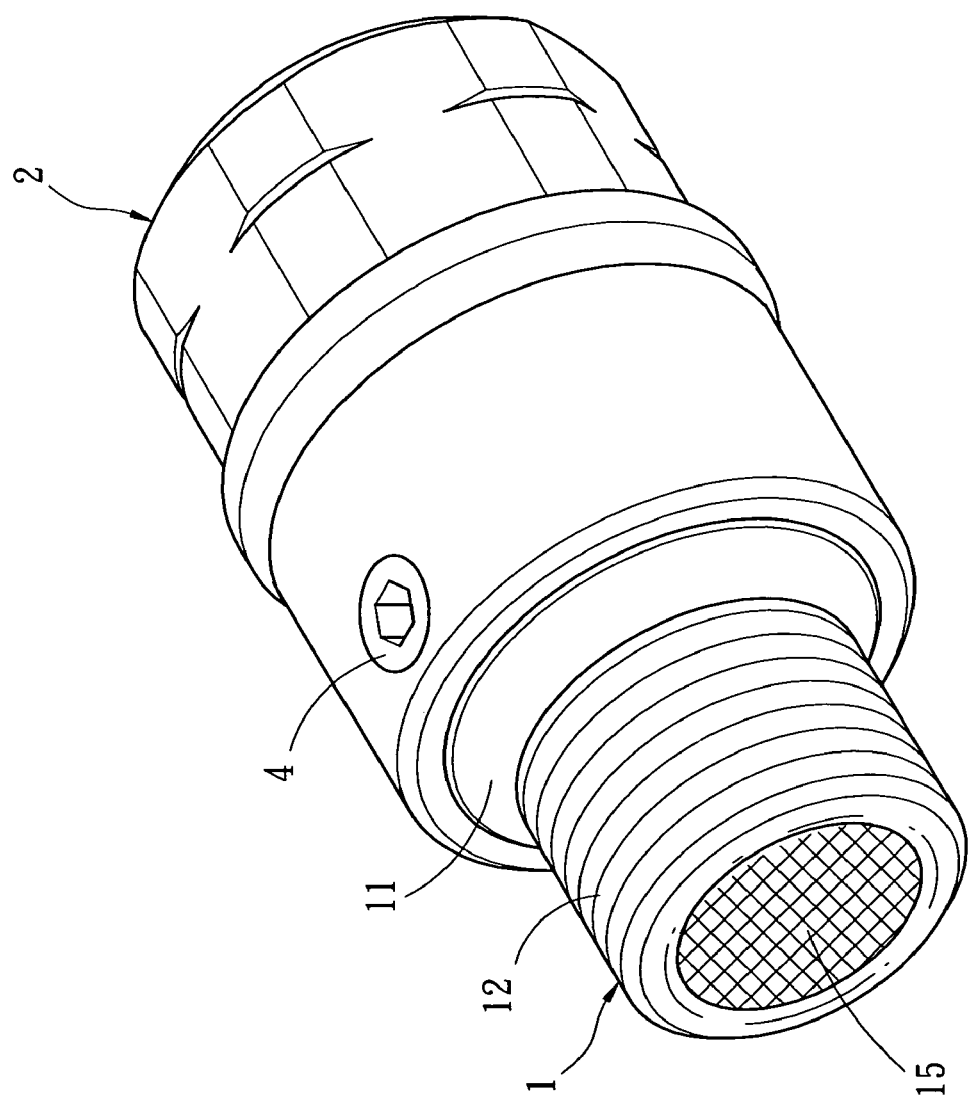
FIG. 2 is a perspective view of the present invention.
Figure 3:
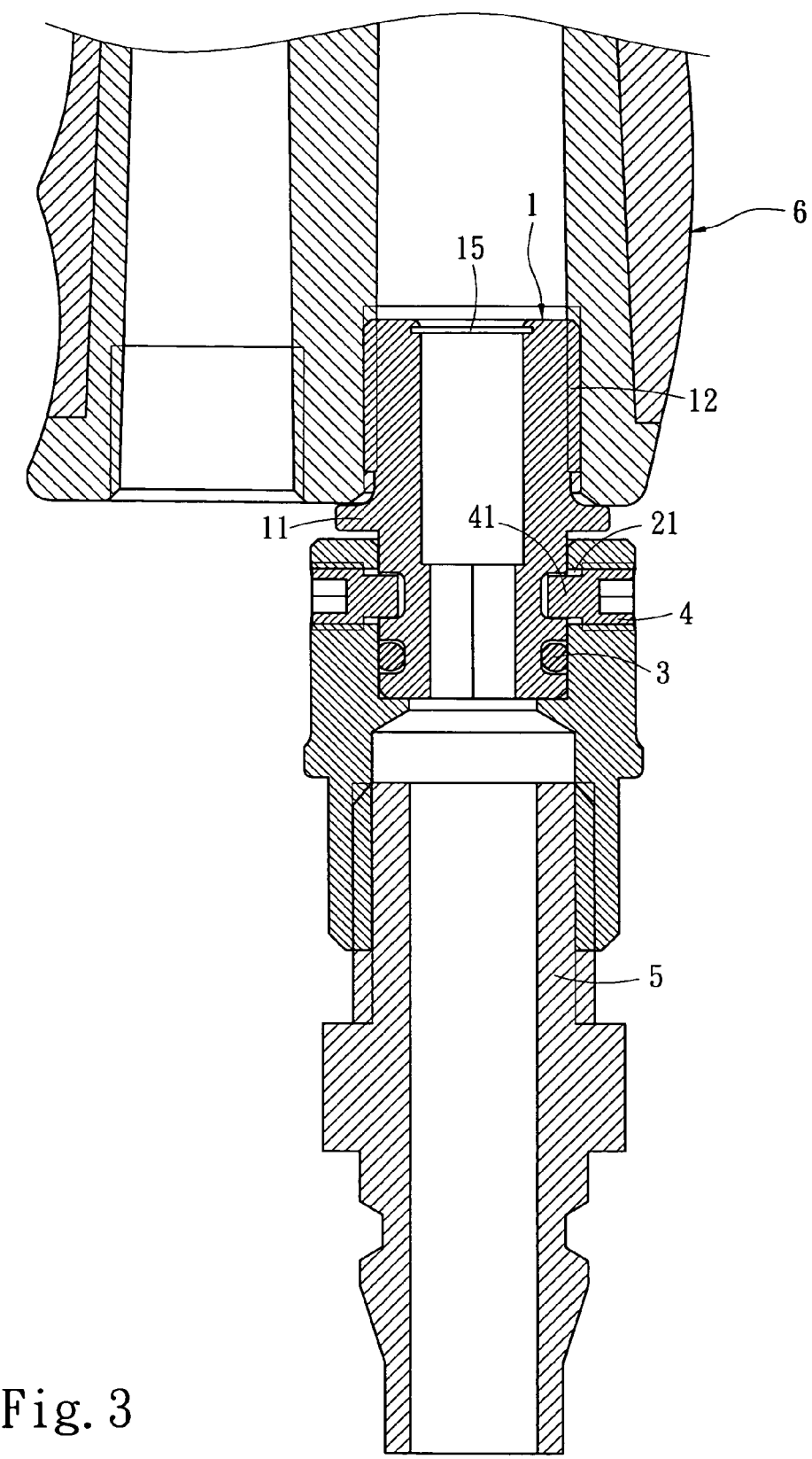
FIG. 3 is a cross-sectional view of the pneumatic tool and the present invention.

Please refer to FIGS. 1 to 3 for the view of disassembled parts, the perspective view and the cross-sectional view of the present invention respectively. In the figures, the improved air nozzle of a pneumatic tool comprises an air input member 1 substantially in a hollow circular form that constitutes a passage for the flow of a pressurized gas, and the air input member 1 further comprises an air net 15 disposed at an end surface of the air input member 1 for preventing damages to the pneumatic tool caused by contaminants entering the pneumatic tool and a blocking section 11 for separating two ends of the air input member 1, wherein one end has a first circular groove 13 for receiving a washer 3 to prevent any possible leakage of the pressurized gas from the pneumatic tool that may affect the operation of the pneumatic tool; and a rotary member 2 being in a circular hollow form and having at least one hole 21 interconnected to the hollow position of the rotary member 2 and a second circular groove 14 disposed between the blocking section 11 of the air inlet member 1 and the first circular groove 13, such that after the air inlet member 1 is installed onto the rotary member 2, a fixture 4 passes through the hole 21 for the locking, and an end 41 of the fixture 4 is disposed inside the second circular groove 14, so that the rotary member 2 and the air inlet member 1 are rotably connected. The foregoing blocking section 11 also limits the rotary member 2 from being excessively mounted onto the air input member 1, so that the hole 21 can be aligned precisely to the corresponding second circular groove 14.

Further, another end of the air inlet member 1 has a thread section 12, and the handle 6 of the pneumatic tool has a corresponding thread, such that the air inlet member 1 and the pneumatic tool can be connected by the screwing connection, and the foregoing blocking section 11 also can be used for preventing the air inlet member 1 from being inserted excessively into the handle 6 of the pneumatic tool when the air inlet member 1 is installed to the handle 6 of the pneumatic tool, and coupling an air pipe 5 with the rotary member 2. To operate in coordination with the position or direction for placing a work piece and a change to the operating environment during the operation of the pneumatic tool, it is necessary to change the direction or angle of the pneumatic tool for its use, so that the end 41 of the fixture 4 of the rotary member 2 moves along the second circular groove 14, and the rotary member 2 uses the air inlet member 1 as an axis for the rotation, and further drives the air supply pipe 5 to rotate simultaneously with the rotary member 2 and prevents the air supply pipe 5 from winding around the pneumatic tool. The invention can enhance the flexibility and convenience of the operation of the pneumatic tool.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An air nozzle for pneumatic tools, inputting a pressurized gas into a pneumatic tool through an air supply pipe to drive said pneumatic tool to operate, comprising:

an air inlet member, being hollow and having one end coupled to said pneumatic tool and the other end rotatably coupled to a rotary member, said rotary member rotating correspondingly with said air inlet member, and said rotary member being hollow and having another end coupled to said air supply pipe, such that said air supply pipe simultaneously rotates with said rotary member, wherein said air inlet member comprises a second circular groove, and said rotary member at its periphery comprises at least one hole interconnected to a hollow of said rotary member, such that said rotary member mounts said air inlet member, and a fixture passes through said hole into said second circular groove, thereby rotatably coupling said rotary member and said air inlet member.

2. The air nozzle for pneumatic tools of claim 1, wherein said air inlet member has a thread section and said pneumatic tool has a corresponding thread, such that said air inlet member and said pneumatic tool are coupled by a screwing connection.

3. The air nozzle for pneumatic tools of claim 1, wherein said air inlet member comprises a first circular groove for receiving a washer to prevent said pressurized gas from leaking from said pneumatic tool.

* * * * *